US009566935B2

(12) United States Patent
Hicken et al.

(10) Patent No.: US 9,566,935 B2
(45) Date of Patent: Feb. 14, 2017

(54) DOUBLE FOLD AND ROLL CUSHIONS FOR IC

(71) Applicant: Autoliv ASP, Inc., Ogden, UT (US)

(72) Inventors: Paul Hicken, Syracuse, UT (US); Daisuke Sato, South Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/776,876

(22) PCT Filed: Mar. 7, 2014

(86) PCT No.: PCT/US2014/021472
§ 371 (c)(1),
(2) Date: Sep. 15, 2015

(87) PCT Pub. No.: WO2014/149907
PCT Pub. Date: Sep. 25, 2014

(65) Prior Publication Data
US 2016/0039383 A1    Feb. 11, 2016

Related U.S. Application Data

(60) Provisional application No. 61/798,766, filed on Mar. 15, 2013.

(51) Int. Cl.
*B60R 21/232* (2011.01)
*B60R 21/2338* (2011.01)
(Continued)

(52) U.S. Cl.
CPC ........... *B60R 21/232* (2013.01); *B60R 21/213* (2013.01); *B60R 21/233* (2013.01); *B60R 21/237* (2013.01);
(Continued)

(58) Field of Classification Search
CPC .. B60R 21/232; B60R 21/2342; B60R 21/213; B60R 21/233; B60R 21/237
See application file for complete search history.

(56) References Cited

U.S. PATENT DOCUMENTS 5,333,903 A * 8/1994 Eyrainer ............... B60R 21/239
                                                              280/743.1
5,636,862 A   6/1997 Cheung et al.
(Continued)

FOREIGN PATENT DOCUMENTS

EP    1824710      8/2007
EP    1781508 B1   9/2009
GB    2343420 A *  5/2000 ......... B60R 21/2338

*Primary Examiner* — Ruth Ilan
(74) *Attorney, Agent, or Firm* — Madson IP, P.C.

(57) ABSTRACT

An airbag assembly may include an inflatable curtain airbag with a stowed configuration and a deployed configuration. The inflatable curtain may have a first protection zone and a second protection zone that inflates forward or rearward of the first protection zone to provide enhanced protection. The second protection zone may be double-folded against the first protection zone so that, during deployment, the second protection zone pivots to unfold relative to the first protection zone. Attachment features such as tack stitching may be used to secure the folded portions together. The tack stitching may be designed to break during deployment of the airbag such that the first protection zone inflates first, followed by a proximal portion of the second protection zone, and then by a distal portion of the second protection zone.

17 Claims, 9 Drawing Sheets

(51) Int. Cl.
    *B60R 21/2342*  (2011.01)
    *B60R 21/237*   (2006.01)
    *B60R 21/213*   (2011.01)
    *B60R 21/233*   (2006.01)

(52) U.S. Cl.
    CPC ....... *B60R 21/2338* (2013.01); *B60R 21/2342* (2013.01); *B60R 2021/23386* (2013.01)

(56) References Cited

U.S. PATENT DOCUMENTS

| | | | |
|---|---|---|---|
| 5,791,685 A | 8/1998 | Lachat et al. | |
| 5,899,495 A * | 5/1999 | Yamamoto | B60R 21/2342 280/743.1 |
| 6,196,575 B1 * | 3/2001 | Ellerbrok | B60R 21/233 280/729 |
| 6,234,516 B1 | 5/2001 | Boxey | |
| 6,237,943 B1 | 5/2001 | Brown et al. | |
| 6,343,811 B1 | 2/2002 | Hammer et al. | |
| 6,361,068 B1 | 3/2002 | Stein et al. | |
| 6,565,118 B2 | 5/2003 | Bakhsh et al. | |
| 6,709,008 B2 | 3/2004 | McGee et al. | |
| 7,093,854 B2 | 8/2006 | Fischer et al. | |
| 7,325,826 B2 | 2/2008 | Noguchi et al. | |
| 7,549,672 B2 * | 6/2009 | Sato | B60R 21/207 280/729 |
| 7,556,290 B2 | 7/2009 | Williams et al. | |
| 7,621,561 B2 | 11/2009 | Thomas et al. | |
| 7,712,773 B2 | 5/2010 | Walston | |
| 7,712,774 B2 | 5/2010 | Garner et al. | |
| 7,762,578 B2 | 7/2010 | Dix | |
| 7,823,922 B2 | 11/2010 | Mitchell et al. | |
| 7,841,621 B2 | 11/2010 | Dix | |
| 8,262,130 B2 | 9/2012 | Fischer et al. | |
| 8,272,664 B2 | 9/2012 | Benny et al. | |
| 8,282,124 B2 | 10/2012 | Trovato et al. | |
| 9,266,494 B2 * | 2/2016 | Wang | B60R 21/237 |
| 2007/0069509 A1 * | 3/2007 | Kokeguchi | B60R 21/18 280/733 |
| 2007/0152435 A1 | 7/2007 | Jamison et al. | |
| 2008/0012274 A1 * | 1/2008 | Zauritz | B60R 21/232 280/729 |
| 2009/0033081 A1 | 2/2009 | Flischer et al. | |
| 2010/0013203 A1 | 1/2010 | Mitchell et al. | |
| 2010/0237597 A1 | 9/2010 | Dix | |
| 2011/0260436 A1 * | 10/2011 | Park | B60R 21/2342 280/735 |
| 2011/0285117 A1 | 11/2011 | Shamoto | |
| 2012/0256401 A1 | 10/2012 | Kato | |
| 2012/0267883 A1 | 10/2012 | Fischer et al. | |
| 2012/0280478 A1 | 11/2012 | Fink | |
| 2012/0286499 A1 | 11/2012 | Wiik et al. | |
| 2015/0375710 A1 * | 12/2015 | Sievers | B60R 21/237 280/730.2 |

\* cited by examiner

DOUBLE FOLD AND ROLL CUSHIONS FOR IC

RELATED APPLICATION

This patent application is a nationalization of and claims the benefit of International Application No. PCT/US2014/021472 filed Mar. 7, 2014 under the Patent Cooperation Treaty, and also claims the benefit of U.S. Provisional Patent Application Ser. No. 61/798,766 that was filed on Mar. 15, 2013, for an invention titled DOUBLE FOLD AND ROLL CUSHIONS FOR IC. Each of these applications are expressly incorporated herein by this reference.

TECHNICAL FIELD

The present invention relates to automotive safety. More specifically, the present invention relates to inflatable airbag curtains and methods that provide enhanced protection for collisions such as small overlap and oblique frontal collisions, rollovers, and side impact collisions.

BACKGROUND

Inflatable safety restraint devices, or airbags, are mandatory on most new vehicles. Airbags are typically installed as part of a system with an airbag module in the steering wheel on the driver's side of car and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of the driver and passenger to protect them from harmful impact with the interior of the car. Typically, airbags are concealed within the vehicle trim to be invisible during normal vehicle operation.

Airbag systems have also been developed in response to the need for similar protection from lateral impacts between an occupant and the side of a vehicle's interior. This might occur when another vehicle collides with the side of the car, or in a rollover situation where the side of car is repeatedly impacting the ground. Side impact airbags are often called "inflatable curtains." Many inflatable curtains are stowed along the corner where the vehicle roof meets the side windows and pillars. These inflatable curtains may be stowed behind the headliner trim at the edge of the headliner, which is the fabric covering the roof of the vehicle.

Recent safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The occupants of a vehicle may be at any of a wide variety of positions within the vehicle at the time of deployment, so it is desirable to provide airbag systems that protect against impact over the broadest possible range of occupant locations.

It has been observed that some existing inflatable curtain designs do not provide adequate protection in the event of certain collision events, such as rollover collisions. In a rollover collision, the position and trajectory of vehicle occupants is difficult to predict. Accordingly, known inflatable curtains designed to protect against a pure lateral impact may not be in the proper position to provide the protection that is most needed. The result may be injuries from impact with interior vehicle surfaces and/or ejection from the vehicle, despite deployment of the airbag systems.

Additionally, one safety need that has recently become apparent is the need for enhanced protection in the event of "small overlap" and "oblique" collisions. A small overlap collision is a frontal collision in which the impact occurs on a relatively narrow portion on the left or right side of the front of the vehicle. An oblique collision is a frontal collision in which the impact occurs at an angle from head-on and on a relatively narrow portion on the left or right side of the front of the vehicle. Such collisions may lead to greater deformation of the vehicle structure on the side on which the impact occurs. Also, such collisions tend to cause the center of the vehicle to rotate away from the line of travel which can cause the vehicle occupant to move in a forward outboard trajectory. Additionally, existing airbag systems may not sufficiently protect against small overlap and oblique collisions because the trajectory of the occupants within the vehicle may be different from those for which the airbag systems are designed to provide protection. For example, in a vehicle with a driver's side airbag and an inflatable curtain airbag, the driver's head may move forward with a vector that has forward and lateral components so that the head tends to move between the deployed driver's side airbag and the deployed inflatable curtain airbag. This may cause the driver's head to strike the A-pillar or the instrument panel of the vehicle in spite of the deployment of the airbag systems.

SUMMARY OF THE INVENTION

The various systems and methods of the present invention have been developed in response to the present state of the art, and in particular, in response to the problems and needs in the art that have not yet been fully solved by currently available airbag systems and methods. Thus, it is advantageous to provide airbag systems and methods that provide reliable protection for vehicle occupants in a wide variety of collision situations. Further, it is advantageous to minimize manufacturing and installation costs. The present invention may have other benefits that are not specifically set forth herein.

To achieve the foregoing, and in accordance with the invention as embodied and broadly described herein, an airbag assembly may be disposed proximate a roof of a vehicle to shield a vehicle occupant from impacting at least one lateral surface of the vehicle. The airbag assembly may include an inflatable curtain airbag having a stowed configuration proximate the roof of the vehicle and a deployed configuration into which the inflatable curtain airbag deploys downward between the vehicle occupant and the at least one lateral surface of the vehicle. The inflatable curtain airbag may have a first protection zone with a first interior chamber, a second protection zone with a second interior chamber in fluid communication with the first interior chamber, and a first attachment feature. In the stowed configuration, the inflatable curtain airbag may be folded rearward or forward at a first stowed fold line such that the second protection zone overlies a portion of the first protection zone. The first attachment feature may secure the second protection zone to the portion of the first protection zone to keep the second protection zone folded rearward or forward until deployment such that, during deployment, the first attachment feature releases the second protection zone to allow the second protection zone to unfold forward or rearward of the first protection zone.

The first attachment feature may be tack stitching that breaks in response to application of a threshold level of stress on the tack stitching to release the second protection zone from the first protection zone. The first protection zone may have a first non-inflating region and the second protection zone may have a second non-inflating region. The first attachment feature may secure the first non-inflating region to the second non-inflating region.

The second protection zone may have a distal portion and a proximal portion positioned between the distal portion and the first protection zone in the deployed configuration. In the stowed configuration, the second protection zone may further be folded at a second stowed fold line such that the distal portion overlies the proximal portion. The inflatable curtain airbag may further have a second attachment feature. In the stowed configuration, the second attachment feature may secure the distal portion to the proximal portion to keep the distal portion and the proximal portion folded together until deployment. During deployment, the second attachment feature may release the distal portion from the proximal portion to allow the distal portion to unfold forward or rearward of the proximal portion.

The inflatable curtain airbag may further have a third attachment feature. In the stowed configuration, the third attachment feature may cooperate with the first attachment feature to secure the second protection zone to the portion of the first protection zone. The first attachment feature may be positioned proximate a top edge of the second protection zone and the third attachment feature may be positioned proximate a bottom edge of the second protection zone. The second attachment feature may be positioned proximate a location equidistant from the top edge and the bottom edge.

The second stowed fold line may be substantially parallel to the first fold line. The inflatable curtain airbag may be folded such that the proximal portion lies generally between the distal portion and the first protection zone. The first and second attachment features may be positioned and configured such that during deployment, the proximal portion substantially inflates prior to release of the second attachment feature to allow the distal portion to unfold forward or rearward of the proximal portion.

The second protection zone may be positioned to inflate inboard of a lateral surface toward a rear end of the vehicle. In the stowed configuration, the inflatable curtain airbag may be folded forward at the first stowed fold line. The airbag assembly may further have an inflator that produces gas in response to detection of impact to trigger deployment of the inflatable curtain airbag, and at least one tether with a first end secured to the inflatable curtain airbag and a second end securable to the vehicle to help keep the inflatable curtain airbag in place after deployment.

According to one method, an airbag assembly may be stowed proximate a roof of a vehicle having a lateral surface, to protect an occupant in the vehicle. The method may include providing an inflatable curtain airbag with a first protection zone having a first interior chamber and a second protection zone having a second interior chamber in fluid communication with the first interior chamber, folding the inflatable curtain airbag at a first stowed fold line such that the second protection zone overlies at least a portion of the first protection zone, securing the second protection zone to the portion of the first protection zone with a first attachment feature to keep the second protection zone folded rearward or forward until deployment, compacting the inflatable curtain airbag into a generally elongated shape, and securing the inflatable curtain airbag proximate the roof of the vehicle such that, in response to introduction of inflation gas into the inflatable curtain airbag, the first protection zone expands downward to be positioned between the occupant and the lateral surface of the vehicle. Securing the second protection zone to the portion of the first protection zone may include applying the first attachment feature such that, during deployment, the first attachment feature releases the second protection zone to allow the second protection zone to unfold forward or rearward of the first protection zone.

The first attachment feature may be tack stitching. Securing the second protection zone to the portion of the first protection zone may include sewing the second protection zone to the portion of the first protection zone with the tack stitching such that the tack stitching breaks in response to application of a threshold level of stress on the tack stitching to release the second protection zone from the first protection zone. The first protection zone may have a first non-inflating region and the second protection zone may have a second non-inflating region. Securing the second protection zone to the portion of the first protection zone may include securing the first non-inflating region to the second non-inflating region.

The second protection zone may include a distal portion and a proximal portion positioned between the distal portion and the first protection zone after deployment. The method may further include folding the inflatable curtain airbag at a second stowed fold line such that the distal portion overlies the proximal portion, and securing the distal portion to the proximal portion with a second attachment feature to keep the distal portion and the proximal portion folded together until deployment. Securing the distal portion to the proximal portion may include applying the second attachment feature such that, during deployment, the second attachment feature releases the distal portion from the proximal portion to allow the distal portion to unfold forward or rearward of the proximal portion.

Securing the second protection zone to the portion of the first protection zone may further include applying a third attachment feature such that, during deployment, the third attachment feature releases the second protection zone to allow the second protection zone to unfold forward or rearward of the first protection zone. Applying the first attachment feature may include securing the first attachment feature proximate a top edge of the second protection zone. Applying the third attachment feature may include securing the third attachment feature proximate a bottom edge of the second protection zone. Applying the second attachment feature may include securing the second attachment feature proximate a location equidistant from the top edge and the bottom edge.

Applying the first and second attachment features may include securing the first and second attachment features such that during deployment, the proximal portion substantially inflates prior to release of the second attachment feature to allow the distal portion to unfold forward or rearward of the proximal portion. The method may further include providing an inflator that produces gas in response to detection of impact to trigger deployment of the inflatable curtain airbag, connecting the inflator to the inflatable curtain airbag, and providing a plurality of mounting assemblies distributed along a length of the inflatable curtain airbag. The mounting assemblies may be secured to the vehicle to attach the inflatable curtain airbag to the vehicle such that the second protection zone is positioned to inflate inboard of a lateral surface toward a rear end of the vehicle. Folding the inflatable curtain airbag at the first stowed fold line may include folding the inflatable curtain airbag forward at the first stowed fold line.

An airbag assembly may include an inflatable curtain airbag stowed proximate a roof of a vehicle. The inflatable curtain airbag may have a first protection zone, a first attachment feature, and a second protection zone folded against the first protection zone such that the second protection zone overlies at least a portion of the first protection zone, an inflator in fluid communication with a first chamber within the first protection zone and a second chamber within the second protection zone, a plurality of mounting assemblies that secure the first protection zone to the vehicle, and at least one tether comprising a first end secured to the inflatable curtain airbag and a second end securable to the vehicle to help keep the inflatable curtain airbag in place after deployment. Prior to deployment, the first attachment feature may secure the second protection zone to the portion of the first protection zone to keep the second protection zone folded rearward or forward until deployment such that, in response to production of gas by the inflator, the first protection zone deploys downward between a vehicle occupant and at least one lateral surface of the vehicle, and the first attachment feature releases the second protection zone to allow the second protection zone to unfold forward or rearward of the first protection zone.

The first attachment feature may be first tack stitching that breaks in response to application of a threshold level of stress on the first tack stitching to release the second protection zone from the first protection zone. The first protection zone may have a first non-inflating region and the second protection zone may have a second non-inflating region. The first tack stitching may secure the first non-inflating region to the second non-inflating region.

The second protection zone may include a distal portion and a proximal portion positioned between the distal portion and the first protection zone after deployment. Prior to deployment, the second protection zone may further be folded such that the distal portion overlies the proximal portion and the proximal portion lies generally between the distal portion and the first protection zone. The inflatable curtain airbag may further have a second attachment feature. Prior to deployment, the second attachment feature may secure the distal portion to the proximal portion to keep the distal portion and the proximal portion folded together until deployment. During deployment, the second attachment feature may release the distal portion from the proximal portion to allow the distal portion to unfold forward or rearward of the proximal portion.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Exemplary embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the apparatus, system, and method of the present invention, as represented in FIGS. 1 through 9, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Figure 1:
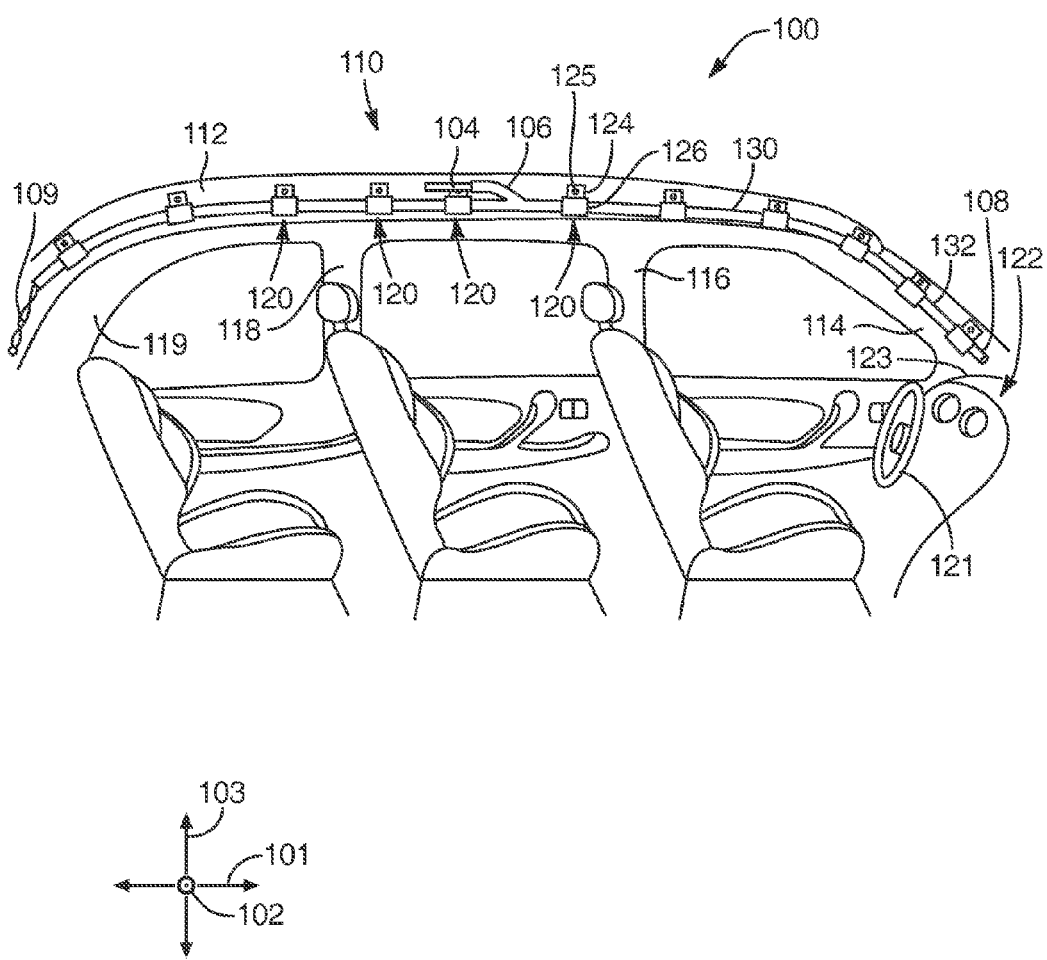
FIG. 1 is a side elevation view of an airbag assembly in a stowed configuration within a vehicle according to one embodiment of the invention.

Referring to FIG. 1, an airbag assembly 100 may be used to protect the occupants of a vehicle during a side collision or roll-over collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward.

The terms "inboard" and "outboard" may be used to refer to the position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two equal halves. "Inboard" and "outboard" do not require alignment of the two objects in the lateral direction 102; rather, these terms simply relate to proximity to the lateral or medial planes as set forth above.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

The airbag assembly 100 may include an inflator 104, a tube 106, and an inflatable curtain airbag 110 that receives gas from the inflator 104 via the tube 106. The airbag assembly 100 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. The inflator 104 may be stored at any suitable location relative to the inflatable curtain airbag 110. If the inflator 104 is a pyrotechnic inflator, the inflator 104 may contain a propellant that ignites to rapidly produce inflation gas in response to receipt of the activation signal.

The inflatable curtain airbag 110 may extend along the longitudinal direction 101 within the vehicle. The inflatable curtain airbag 110 may be coupled to or next to a roof rail 112 of the vehicle. The airbag assembly 100 may also include a forward tether 108 and a rearward tether 109 that are coupled proximate the front and rear ends, respectively, of the inflatable curtain airbag 110. Upon inflation of the inflatable curtain airbag 110, the forward tether 108 and the rearward tether 109 may provide tension that helps keep the inflatable curtain airbag 110 in place.

In the event of a collision, the inflatable curtain airbag 110 may expand downward along the side of the vehicle between the vehicle occupants and one or more lateral surfaces of the vehicle such as the side windows and pillars (the structures between the lateral windows and/or the windshield and rear window) of the vehicle. The pillars may include an A-pillar 114, a B-pillar 116, a C-pillar 118, and, if present, a D-pillar 119, all of which may join the roof rail at their upper ends. In some embodiments, an inflatable curtain airbag may extend from an A-pillar to a C-pillar of the vehicle. In other embodiments such as that illustrated in FIG. 1, the inflatable curtain airbag 110 may extend from the A-pillar 114 to a D-pillar 119 of the vehicle.

In addition to the airbag assembly 100, other airbags may be installed in the vehicle. For example, a separate driver's side airbag (not shown in FIG. 1) may be used to protect an occupant (i.e., the driver) from impact with various forward surfaces of the vehicle, including the steering wheel 121 and instrument panel 122. The airbag assembly 100 may provide supplemental protection by cushioning impact not only against the lateral surfaces mentioned previously, but also cushioning impact against the A-pillar 114 and/or an outboard portion 123 of the instrument panel 122. The outboard portion 123 is the portion of the instrument panel 122 that lies generally outboard of the steering wheel 121.

The inflatable curtain airbag 110 may normally reside in a stowed configuration, in which the inflatable curtain airbag 110 is concealed behind the interior trim of the vehicle, such as the lateral headliner trim (the trim that covers the edges of the headliner, which is typically a sheet of fabric that covers the interior of the vehicle roof). Prior to installation in the vehicle, the inflatable curtain airbag 110 may be compacted into the stowed configuration, such as by rolling, folding, or a combination thereof, such that the inflatable curtain airbag 110 assumes a generally elongated shape extending along a pathway with a length that is much greater than the height or width of its cross-sectional shape.

Once compacted into the stowed configuration, the inflatable curtain airbag 110 may be retained in the stowed configuration through the use of wrappers, fasteners, or the like to facilitate shipping and installation. The inflatable curtain airbag 110 may be secured to the vehicle proximate the roof rail 112. In the embodiment of FIG. 1, integrated wrappers and fastening systems may be provided in the form of a plurality of mounting assemblies 120 distributed along the length of the inflatable curtain airbag 110. Each of the mounting assemblies 120 may include a tab 124 secured to the inflatable curtain airbag 110, a fastener 125 that secures the tab 124 to the roof rail 112, and a wrapper 126 that encircles the inflatable curtain airbag 110 to keep the inflatable curtain airbag 110 in the stowed configuration until deployment.

In alternative embodiments, different mounting assemblies may be used. Such mounting assemblies may include tabs that are integrally formed with the inflatable curtain airbag, alternative fasteners, or the like. The wrappers 126 may not be present in all embodiments; other embodiments may utilize different features or attachment methods to keep the inflatable curtain airbag compacted. Such wrappers or other features may be independent of the mounting assemblies used to secure the inflatable curtain airbag to the vehicle.

As shown, the inflatable curtain airbag 110 may have a first protection zone 130 secured to the roof rail 112 and a second protection zone 132 secured to the pillar 114. Thus, the mounting assemblies 120 may be arranged along the length of the inflatable curtain airbag 110 from a rear location on or near the D-pillar 119 to a forward location proximate a forward end of the A-pillar 114.

Upon activation, the inflator 104 may generate and/or release inflation gas into the tube 106. From the tube 106, the inflation gas may rapidly enter the inflatable curtain airbag 110, thereby causing the inflatable curtain airbag 110 to begin expanding. In response to the expansion, the wrappers 126 may break to release the inflatable curtain airbag 110. Thus, the inflatable curtain airbag 110 may exit the stowed configuration and assume an extended shape. This process is called "deployment." When deployment is complete, the inflatable curtain airbag 110 may be said to be in a deployed configuration, as will be shown and described in FIG. 2.

Figure 2:
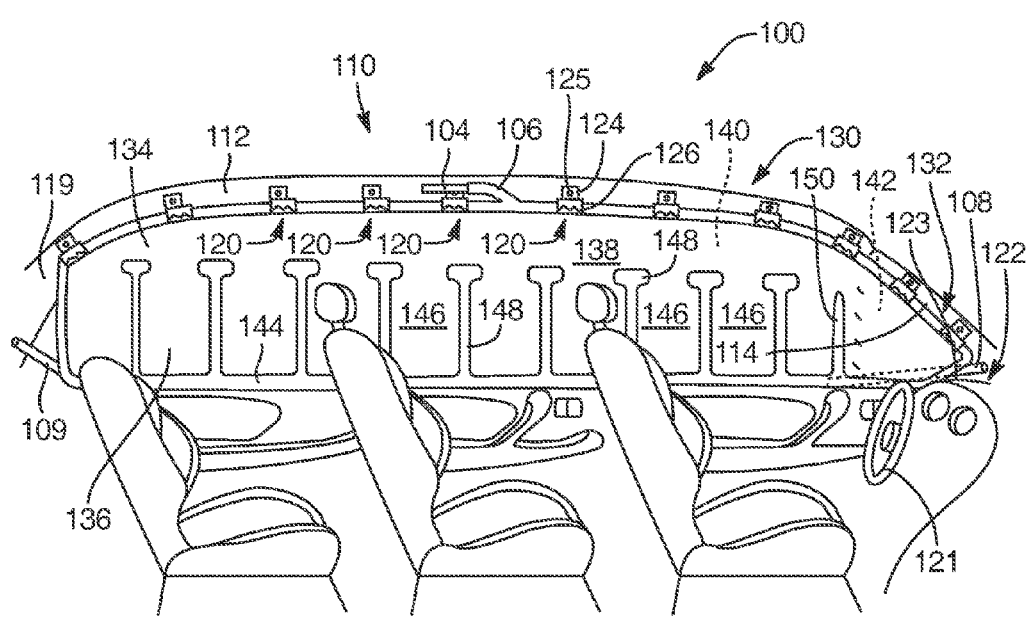
FIG. 2 is a side elevation view of the airbag assembly of FIG. 1, wherein the inflatable curtain airbag is in a deployed configuration.
Figure 2:
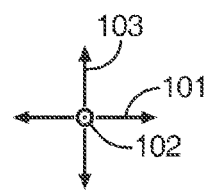

Referring to FIG. 2, a perspective view illustrates the airbag assembly 100, wherein the inflatable curtain airbag 110 is in the deployed configuration. The inflatable curtain airbag 110 may inflate upon activation of the inflator 104 and/or other optional inflators such that the inflatable curtain airbag 110 transitions from the stowed configuration to the deployed configuration. During deployment, the wrapper 126 may tear such that inflatable curtain airbag 110 can exit the stowed configuration. The inflatable curtain airbag 110 may also extend past a B-pillar 116 and a C-pillar 118 (shown in FIG. 1, but obscured in FIG. 2) such that in a deployed configuration, the inflatable curtain airbag at least partially covers the B-pillar 116 and the C-pillar 118, as depicted in FIG. 2. The inflatable curtain airbag 110 may also cover a portion of the D-pillar 119.

FIG. 2 illustrates the positioning of the first protection zone 130 and the second protection zone 132. The first protection zone 130 may generally cover the lateral surfaces of the vehicle from the steering wheel 121 rearward, while the second protection zone 132 covers the lateral surfaces forward of the steering wheel 121. The inflatable curtain airbag 110 may have an upper portion 134 and a lower portion 136.

Figure 3:
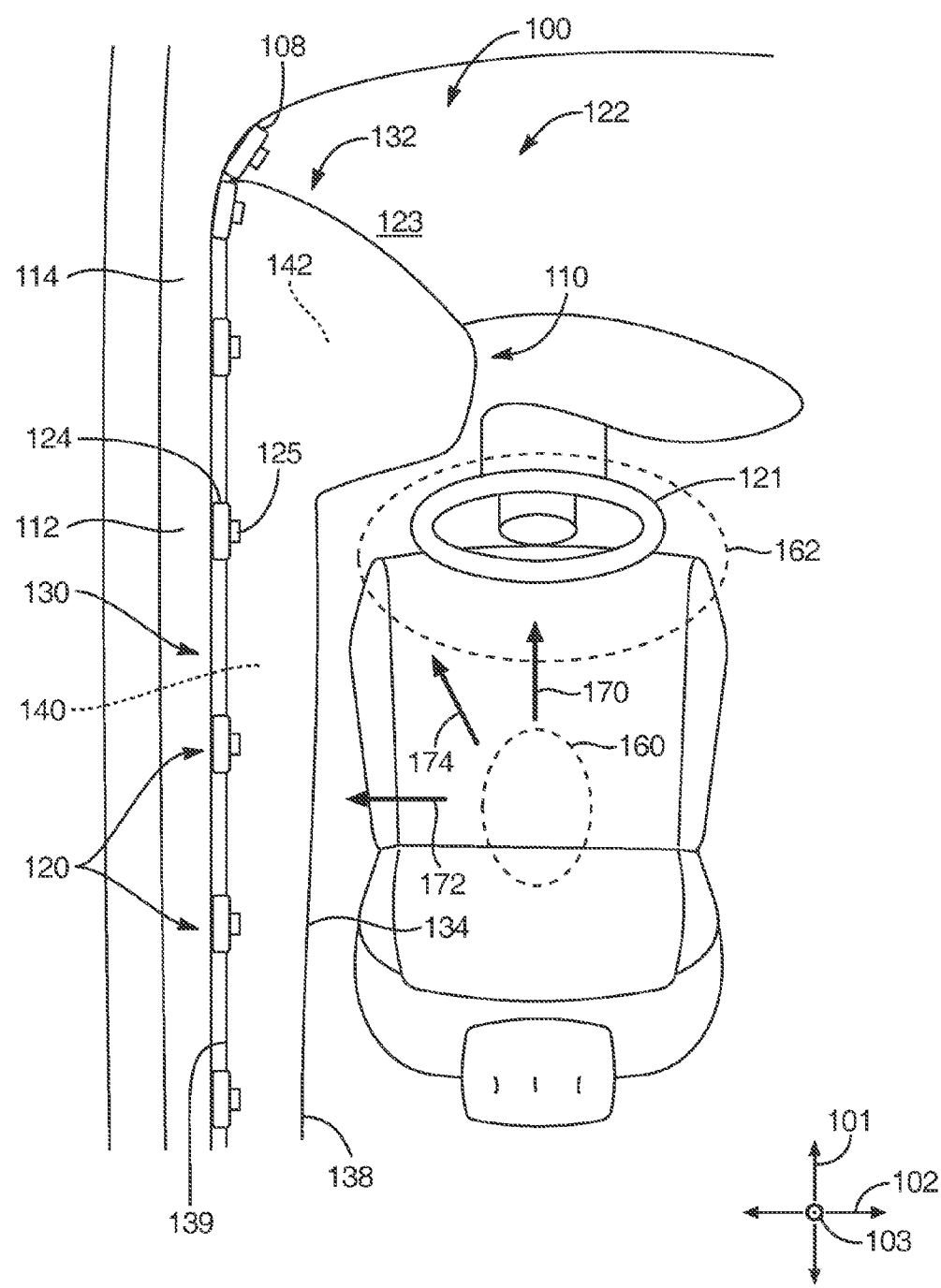
FIG. 3 is a top view of the airbag assembly of FIG. 2, wherein the inflatable curtain airbag is in the deployed configuration.

The inflatable curtain airbag 110 may be generally formed from two pieces of flexible material such as a fabric or thin polymer, and may include an inboard section 138 and an outboard section 139 (visible in FIG. 3). According to one example, the inflatable curtain airbag 110 is generally made from a woven nylon fabric, but other fabrics or flexible materials may be used. The inboard section 138 and the outboard section 139 may be separate pieces of fabric, or may be sections of a single piece of fabric folded together. The inboard section 138 and the outboard section 139 may be secured together via peripheral stitching 144, as shown. In the alternative, the inboard section 138 and the outboard section 139 may be secured together via mechanical fastening, adhesives, one-piece weaving, RF welding, ultrasonic welding, or any other suitable method known in the art.

The inboard section 138 and the outboard section 139 of the inflatable curtain airbag 110 may define a first interior chamber, or a first chamber 140, within the first protection zone 130 and a second interior chamber, or second chamber 142, within the second protection zone 132. A "chamber" may be defined as an interior cavity within a body. Also, throughout this disclosure, the internal cavities that are designated as "chambers" will have dashed reference number lead lines to indicate that the chamber is interior to the inboard section 138 and the outboard section 139 of the inflatable curtain airbag. Inflation gas may be introduced into the first chamber 140 from the inflator 104 via the fill tube 106. The second chamber 142 may receive inflation gas from the first chamber 140. As shown, the first chamber 140 may be divided into inflation cells 146 via interior stitching 148. Dividing the inflatable curtain airbag 110 into inflation cells 146 is designed to maximize cushioning protection while minimizing the volume of inflation gas required to provide optimum protection to occupants.

Referring to FIG. 3, a top view illustrates the airbag assembly 100 with the inflatable curtain airbag 110 in the deployed configuration. Additionally, FIG. 3 illustrates an occupant zone 160 that would ordinarily be occupied by a vehicle occupant's head, or more specifically, the driver's head, along with a deployed position 162 of an exemplary driver's side airbag. In this context, "side" refers not to lateral impact, but to a frontal impact cushion positioned on the driver's side of the vehicle, as opposed to a "passenger's side airbag," which is a frontal impact airbag positioned on the passenger's side of the vehicle.

Additionally, FIG. 3 shows a forward trajectory 170, an outboard trajectory 172, and a forward outboard trajectory 174 of the occupant's head relative to the vehicle. The forward trajectory 170 is where the head may move from the occupant zone 160 during an ordinary (i.e., not small overlap or oblique) frontal collision. The outboard trajectory 172 is where the head may move from the occupant zone 160 during a side impact, such as an impact against the side of the vehicle along which the inflatable curtain airbag 110 inflates. The forward outboard trajectory 174 is where the head may move from the occupant zone 160 during a small overlap or oblique collision.

As shown, the forward outboard trajectory 174 results from a rotation of the vehicle caused by the small overlap or oblique collision and may tend to move the occupant's head outboard of the steering wheel 121 to impact the A-pillar 114 and/or the outboard portion 123 of the instrument panel 122. The presence of the second protection zone 132 may serve to protect the head from such an impact. Thus, the second protection zone 132 may enable the airbag assembly 100 to provide enhanced protection in the event of a rollover or small overlap or oblique collision.

Depending on the layout of the interior stitching 148, the second protection zone 132 may inflate generally simultaneously with the first protection zone 130, or may only inflate after inflation of the first protection zone 130 has substantially completed. If the interior stitching 148, or more specifically, a chamber divider 150 of the interior stitching 148, is positioned to restrict inflation gas flow from the first protection zone 130 into the second protection zone 132, inflation of the second protection zone 132 may be delayed to the extent desired.

The second protection zone 132 may interact with the various interior structures of the vehicle, such as the A-pillar 114, the instrument panel 122, and the steering wheel 121. For example, the second protection zone 132 may butt up against any of these structures during deployment to provide some frictional engagement that helps the second protection zone 132 to remain in place during the potential impact of the occupant's head with the second protection zone 132.

The airbag assembly 100 is shown in use on the driver's side of the vehicle. A similarly configured (i.e., mirror image or near-mirror image) airbag assembly may be used on the passenger's side of the vehicle in addition or in the alternative to the airbag assembly 100. Such an airbag assembly may have a second protection zone similar to the second protection zone 132 to protect the front passenger from impact against the interior surfaces that correspond to the A-pillar 114, the steering wheel 121, and the outboard portion 123 of the instrument panel 122. For example, the passenger's side may have an A-pillar, glove compartment, dashboard, and/or instrument panel that may be beneficially covered by such a second protection zone. The various exemplary embodiments disclosed herein may have equal application to the passenger's side as to the driver's side.

The configuration of the airbag assembly 100 is merely exemplary. A variety of types and configurations of inflatable curtain airbags may be utilized within the scope of the present disclosure. For example, in alternative embodiments, varying sizes, shapes, and proportions of inflatable curtain airbags may be used. An automaker may select from such alternative embodiments based on the desired location within the vehicle, the anticipated collision type and severity, the likely habits of vehicle occupants, and any other criteria recognized by those of skill in the automotive safety arts.

In the embodiment of FIGS. 1-3, the second protection zone 132 may generally be stowed within the trim attached to the A-pillar 114. This may be suitable for some vehicles. However, in some embodiments, it may be desirable to minimize the airbag structure stowed on and/or secured to the A-pillar 114. Some vehicles, and in particular, compact cars, may have very limited space within the trim attached to the A-pillar 114. Additionally, it may be desirable to minimize the risk that any A-pillar trim elements or other components will be projected into the vehicle interior during deployment. Hence, in alternative embodiments, the second protection zone may be stored elsewhere.

Figure 4:
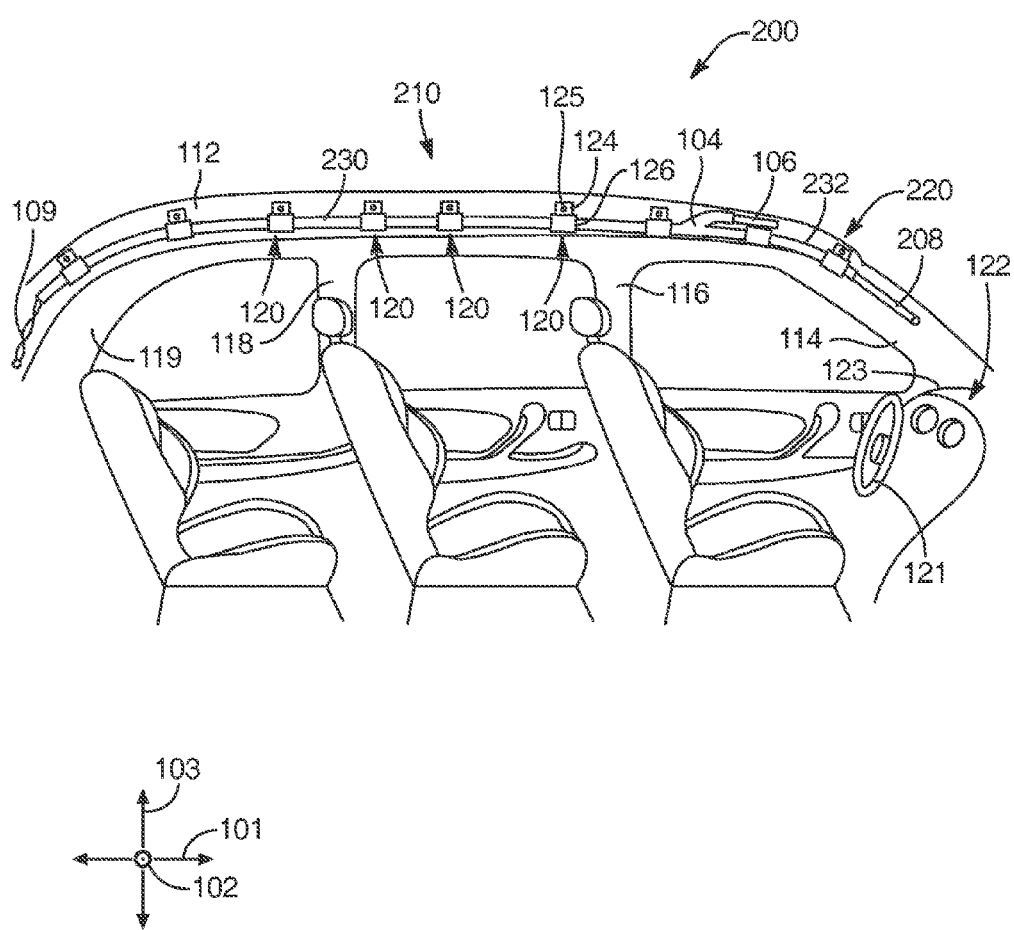
FIG. 4 is a side elevation view of an airbag assembly in a stowed configuration within a vehicle according to one alternative exemplary embodiment of the invention.

Referring to FIG. 4, a side elevation view illustrates an airbag assembly 200 according to an alternative exemplary embodiment of the invention, with an inflatable curtain airbag 210 in a stowed configuration within a vehicle. Like the airbag assembly 100, the airbag assembly 200 may include an inflator 104 connected to the inflatable curtain airbag 210 via a tube 106, and a forward tether 208 and a rearward tether 109 that cooperate to provide tension to keep the inflatable curtain airbag 210 in position upon deployment. The inflatable curtain airbag 210 may be secured to the roof rail 112 via a plurality of mounting assemblies 120, each of which may include a tab 124, a fastener 125, and a wrapper 126. As in the previous embodiment, the wrappers 126 may break open during initial inflation of the inflatable curtain airbag 210 to permit deployment of the inflatable curtain airbag 210.

The inflatable curtain airbag 210 may be designed to minimize the need for storage of or attachment of airbag components to the A-pillar 114. Thus, the inflatable curtain airbag 210 may have a design in which the portions of the inflatable curtain airbag 210 that deploy forward of the steering wheel 121 are positioned adjacent to the forward portion of the roof rail 112 rather than stored within the trim on the A-pillar 114. More specifically, the inflatable curtain airbag 210 may have a first protection zone 230 that deploys generally rearward of the steering wheel 121, and a second protection zone 232 that deploys generally forward of the steering wheel 121.

In the stowed configuration, the second protection zone 232 may be folded longitudinally (i.e., folded in the longitudinal direction 101, which is parallel to the length of the vehicle). In the embodiment of FIG. 4, this longitudinal folding may entail folding the second protection zone 232 rearward to overlie the first protection zone 230. In alternative embodiments, longitudinal folding of a protection zone may entail forward folding instead of rearward folding.

The term "overlie" refers to two objects with outward-facing surfaces that are positioned against each other. In the embodiment of FIG. 4, the second protection zone 232 may be double-folded against the first protection zone 230 in a manner that will be set forth in greater detail in the description of FIGS. 6-8.

Due to the manner in which the second protection zone 232 is folded against the first protection zone 230, the package defined by the inflatable curtain airbag 210 in the stowed configuration of FIG. 4 may be somewhat larger proximate the forward portion of the roof rail 112 than that of the inflatable curtain airbag 110 of the previous embodiment. None of the mounting assemblies 120 need be secured to the A-pillar 114. This leaves the A-pillar 114 free of airbag components apart from the forward tether 208. This may minimize the bulk of material stored within the trim on the A-pillar 114. Further, such a configuration may enhance the overall safety level of the airbag assembly 200 by reducing the risk of airbag components being projected from the A-pillar or the A-pillar trim during deployment of the airbag assembly 200.

The airbag assembly 200 may have a forward mounting assembly 220 that is reinforced or otherwise configured differently from the other mounting assemblies 120 due to the fact that the forward mounting assembly 220 may need to resist the stresses that may be occasioned by the deployment of and/or occupant impact with the second protection zone 232. In the airbag assembly 100 of the previous embodiments, these stresses may act upon the mounting assemblies 120 attached to the A-pillar 114. In the airbag assembly 200 of FIG. 4, these stresses, as well as stresses associated with the operation of the forward portion of the first protection zone 230, may be focused on the forward mounting assembly 220. Thus, it may be necessary to configure the forward mounting assembly 220 different from the mounting assemblies 120.

Figure 5:
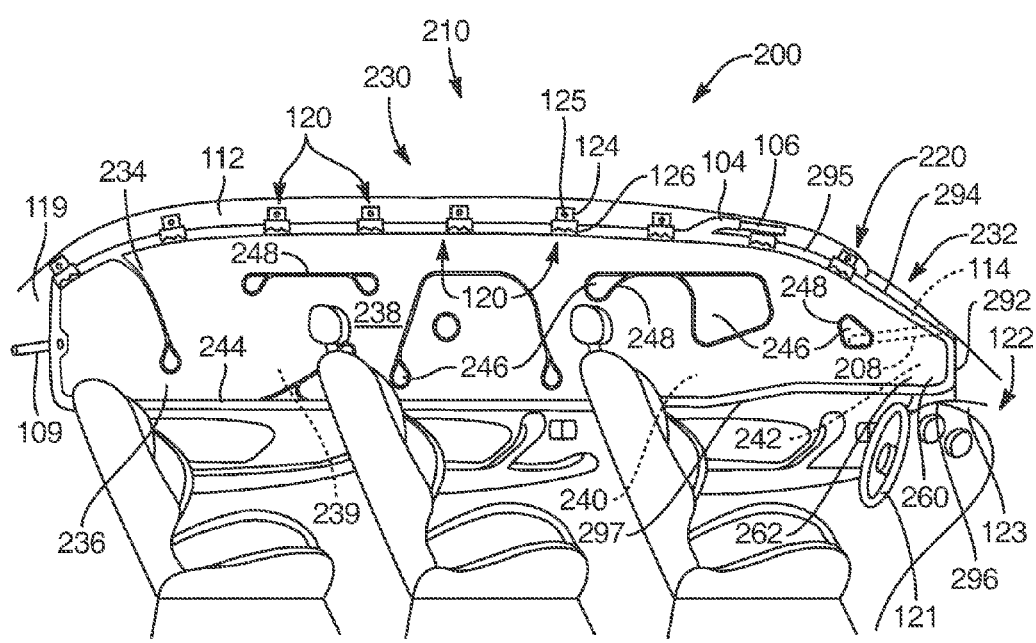
FIG. 5 is a side elevation view of the airbag assembly of FIG. 4, wherein the inflatable curtain airbag is in a deployed configuration.
Figure 5:
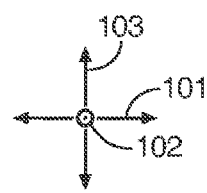

Referring to FIG. 5, a side elevation view illustrates the airbag assembly 200 of FIG. 4, with the inflatable curtain airbag 210 in the deployed configuration. Deployment may initially occur substantially as set forth above in the description of the airbag assembly 100 of FIGS. 1-3. Thus, as shown, the wrappers 126 may break open to release the inflatable curtain airbag 210, and the inflatable curtain airbag 210 may extend downward to protect occupants of the vehicle from impact against the lateral surfaces of vehicle.

As shown, the inflatable curtain airbag 210 has a configuration generally similar to that of the inflatable curtain airbag 110, with some differences. The inflatable curtain airbag 210 may have an upper portion 234 and a lower portion 236. The inflatable curtain airbag 210 may be formed by an inboard section 238 and an outboard section 239 (facing away from the viewpoint of FIG. 5) that are secured together through any of the methods mentioned previously with peripheral stitching 244 and interior stitching 248. The inboard section 238 and the outboard section 239 may cooperate to define a first chamber 240 within the first protection zone 230 and a second chamber 242 within the second protection zone 232. The boundaries of the first chamber 240 and the second chamber 242 may be defined by the geometry of the peripheral stitching 244 and the interior stitching 248.

The inflatable curtain airbag 210 may not have inflation cells like the inflation cells 146 of the previous embodiment, but may, instead, have a plurality of non-inflating regions 246 defined by the interior stitching 248. The non-inflating regions 246 may be positioned proximate areas where impact from a vehicle occupant is unlikely, or where it is desirable to attach a tether or another airbag component. Such attachment may beneficially be done at the non-inflating regions 246 because the attachment can be carried out through the inboard section 238 and the outboard section 239 without impeding the inflation of the inflatable curtain airbag 210. The non-inflating regions 246 may also serve to reduce the volume of the inflatable curtain airbag 210 in the deployed configuration, thereby reducing the amount of inflation gas required, and thence, the size of the inflator 104.

The second protection zone 232 may be much different from the second protection zone 132 of the previous embodiment in that the second protection zone 232 may be much more compact, and may be relatively narrow when deployed. This may help ensure that the inflatable curtain airbag 210, and particularly the enlarged, forward portion of the inflatable curtain airbag 210 where the second protection zone 232 overlies the first protection zone 230, compacts into the space provided for it in the trim for the roof rail 112.

The second protection zone 232 may have a forward edge 292, a top edge 294, and a bottom edge 296. The top edge 294 may cooperate with a top edge 295 of the first protection zone 230 to define an overall top edge of the inflatable curtain airbag 210. Similarly, the bottom edge 296 may cooperate with a bottom edge 297 of the first protection zone 230 to define an overall bottom edge of the inflatable curtain airbag 210. The second protection zone 232 may have a distal portion 260 adjacent to the forward edge 292 and a proximal portion 262 between the distal portion 260 and the first protection zone 230.

During deployment, the inflation of the first protection zone 230 and the second protection zone 232 may cause the second protection zone 232 to generally pivot forward from its stowed position overlying the first protection zone 230. Thus, the second protection zone 232 may first pivot inboard until it extends in the lateral direction 102, wherein it is generally perpendicular to the first protection zone 230. From this position, the second protection zone 232 may continue to pivot forward, but now may pivot outboard. This motion may continue until the second protection zone 232 is generally parallel to the first protection zone 230.

The second protection zone 232 may be dual-folded against the first protection zone 230 such that the distal portion 260 is folded against the proximal portion 262, which is folded against the forward portion of the first protection zone 230. The distal portion 260 and the proximal portion 262 may be folded in a Z-configuration (as viewed along the transverse direction 103). The distal portion 260 may unfold from the proximal portion 262 in addition to unfolding of the proximal portion 262 from the first protection zone 230. These unfolding steps may advantageously be made discrete steps during deployment to ensure that the second protection zone 232 deploys forward prior to excessive inboard expansion. Such inboard expansion may, if not controlled, allow the deploying second protection zone 232 to contact the vehicle occupant prematurely.

Thus, after the second protection zone 232, or more specifically, the proximal portion 262 of the second protection zone 232, unfolds forward from the first protection zone 230 in the manner set forth above, a second unfolding phase may occur in which the distal portion 260 of the second protection zone 232 unfolds from the proximal portion 262. As mentioned previously, the proximal portion 262 may generally pivot inboard to unfold from the first protection zone 230. Usage of the Z-fold, as will be described in greater detail subsequently, may cause the distal portion 260 to pivot outboard to unfold from the proximal portion 262.

After full deployment of the second protection zone 232, the second protection zone 232 may be positioned forward of the first protection zone 230, and may be generally parallel to and coplanar with the first protection zone 230, as illustrated. This position may enable the inflatable curtain airbag 210 to provide superior protection for oblique collisions, small overlap collisions, rollover situations, and/or out-of-position occupant situations, i.e., situations in which the vehicle occupant is not optimally positioned in his or her seat at the time of impact.

The second protection zone 232 may advantageously extend to a height proximate the A-pillar 114 and/or windshield of the vehicle. As a result, after deployment, a top edge 294 of the second protection zone 232 may be positioned proximate to and/or parallel to the A-pillar 114 and/or the windshield of the vehicle. This may enable the second protection zone 232 to effectively cover potential reaction surfaces such as the A-pillar 114, the outboard portion 123 of the instrument panel 122, and/or the adjoining portion of the windshield.

Figure 6:
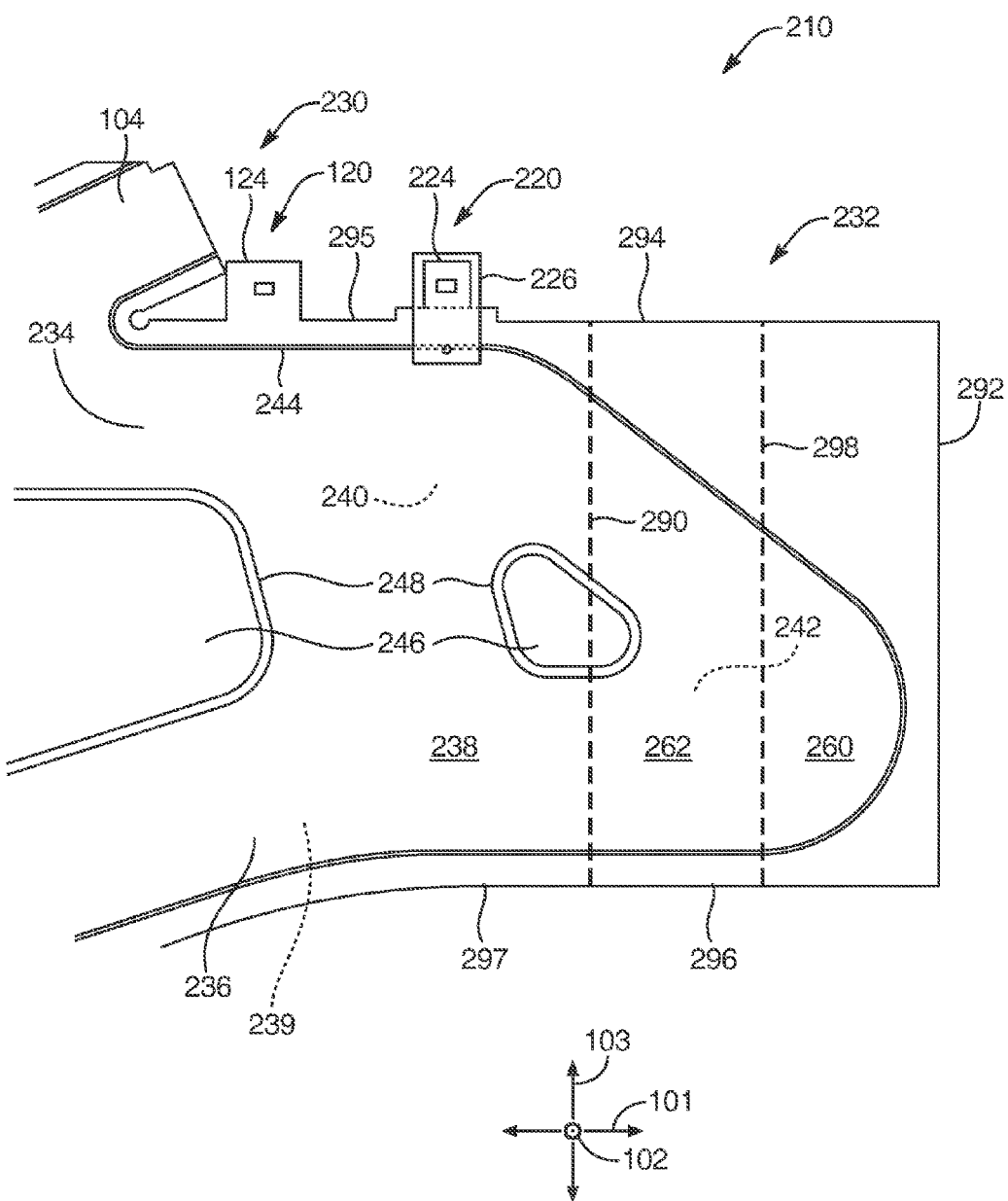
FIG. 6 is a side elevation view of the forward portion of the inflatable curtain airbag of the airbag assembly of FIG. 4, prior to compaction of the inflatable curtain airbag into the stowed configuration.

Referring to FIG. 6, a side elevation view illustrates the forward portion of the inflatable curtain airbag 210 of the airbag assembly 200 of FIG. 4, prior to compaction of the inflatable curtain airbag 210 into the stowed configuration. The top edge 294 may extend parallel to a top edge 295 of the first protection zone 230, and may be of a same height with the top edge 295 upon inflation of the inflatable curtain airbag 210. Thus, the top edge 294 of the second protection zone 232 and the top edge 295 of the first protection zone 230 may cooperate to define a single substantially straight, continuous top edge of the inflatable curtain airbag 210. However, as shown, the peripheral stitching 244 of the second protection zone 232 may be configured such that the portion of the second protection zone 232 proximate the top edge 294 and the forward edge 292 is not inflatable. This may help the second protection zone 232 to effectively fit into place between the outboard portion 123 of the instrument panel 122 and the portion of the windshield adjoining the A-pillar 114.

As mentioned previously, the forward mounting assembly 220 may be configured differently from the mounting assemblies 120 arrayed rearward of it. The forward mounting assembly 220 may have a tab 224 like the tabs 124 of the mounting assemblies 120. However, the tab 224 may be secured to a panel 226 that is also attached to the inflatable curtain airbag 210 downward of the tab 224 to provide additional reinforcement for the tab 224. Thus, the forward mounting assembly 220 may be uniquely configured to handle the additional stresses that may be exerted on it by the operation of the second protection zone 232.

The second chamber 242 of the second protection zone 232, as shown, is a single chamber. However, it should be understood that the second chamber 242 could be divided into multiple chambers without departing from the spirit of the invention. For example, the second chamber 242 could be divided into two adjacent chambers, a forward most chamber and an intermediate chamber. The intermediate chamber could be generally located in the proximal portion 262 and the forward most chamber may be located in the distal portion 260. An airbag configuration with an intermediate chamber and a forward most chamber may align better along the contour of the side door, A-pillar, and instrument panel. One embodiment of the invention could have the intermediate chamber positioned to cushion the vehicle occupant from impacting the A-pillar 114 and the forward most chamber positioned to cushion the vehicle occupant from impacting the instrument panel 122. Of course, a person of skill in the art, armed with the present disclosure, could determine a configuration using multiple chambers that would protect a vehicle occupant for a particular vehicle configuration.

Returning to the embodiment of FIG. 6, the inflatable curtain airbag 210 may be folded at a first stowed fold line 290 and a second stowed fold line 298 to compact it into the stowed configuration. The first stowed fold line 290 may serve as the boundary between the first protection zone 230 and the second protection zone 232, or more specifically, the proximal portion 262. The second stowed fold line may serve as the boundary between the proximal portion 262 and the distal portion 260. As shown, the first stowed fold line 290 passes through a non-inflating region 246. The non-inflating region 246 may also serve as an attachment point for the forward tether 208. In alternative embodiments, the inflatable curtain airbag 210 may be folded at a different location, i.e., either forward or rearward of the non-inflating region 246.

The attachment location of the forward tether 208 (not shown in FIG. 6) to the inflatable curtain airbag 210 may be selected to provide the desired level of tension on the second protection zone 232. More specifically, securing the forward tether 208 forward of the first stowed fold line 290 may cause the forward tether 208 to exert tension in the longitudinal direction 101 on not only the first protection zone 230, but on the second protection zone 232 as well. Such tension may help unfold the second protection zone 232 by helping pivot the second protection zone 232 forward during deployment.

Securing the forward tether 208 rearward of the first stowed fold line 290 may cause the forward tether 208 to exert tension in the longitudinal direction 101 on only the first protection zone 230. Securing the forward tether 208 directly on the first stowed fold line 290, or forward of, but close to, the first stowed fold line 290, may cause the forward tether 208 to exert some level of tension on the second protection zone 232, but with a short moment arm so that the resulting moment tending to pivot the second protection zone 232 forward is relatively small.

According to one example, the inflatable curtain airbag 210 may first be folded outboard at the second stowed fold line 298. Thus, the forward edge 292 may be brought outboard, or into the page with reference to the view of FIG. 6, and then brought rearward (or to the left in the view of FIG. 6) until the forward edge 292 overlies the first stowed fold line 290. Thus, the distal portion 260 may overlie the proximal portion 262. More specifically, the outward-facing surface of the outboard section 239 of the distal portion 260 may be brought into contact with the outward-facing surface of the outboard section 239 of the proximal portion 262. The second stowed fold line 298 may then be the forward edge of the inflatable curtain airbag 210, as shown in FIG. 7.

Figure 7:
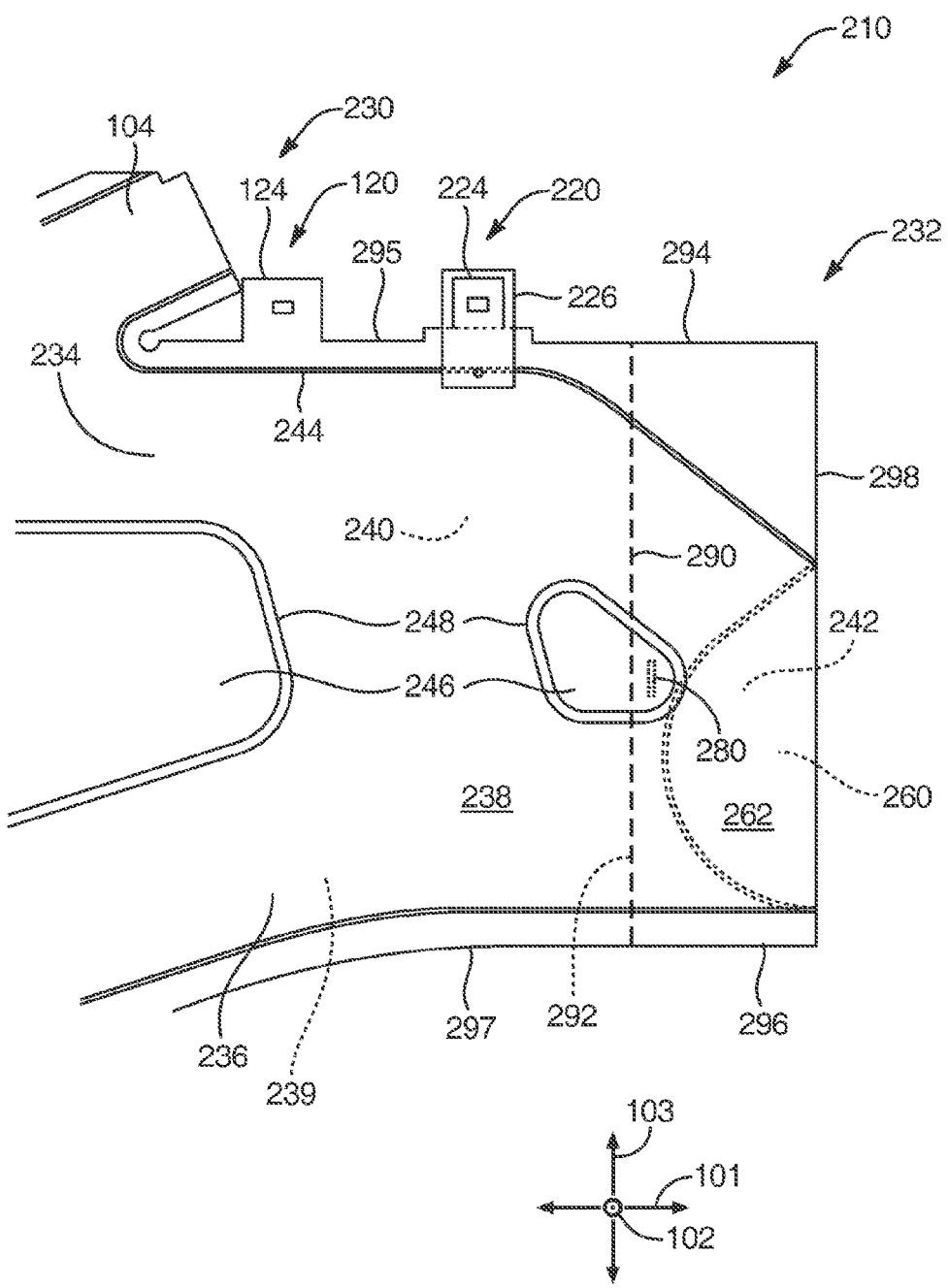
FIG. 7 is a side elevation view of the forward portion of the inflatable curtain airbag assembly of FIG. 4, after folding of the second protection zone rearward to overlie the forward portion of the first protection zone.

Referring to FIG. 7, a side elevation view illustrates the forward portion of the inflatable curtain airbag 210 of the airbag assembly 200 of FIG. 4 after the distal portion 260 has been folded against the proximal portion 262 in the manner described in the description of FIG. 6, but prior to the performance of additional folding steps. The distal portion 260 (shown in phantom) is thus outboard of the remainder of the inflatable curtain airbag 210 in the view of FIG. 7.

After the second protection zone 232 has been folded as described in FIG. 6, the distal portion 260 may optionally be secured to the proximal portion 262. This may facilitate further steps in the compaction and/or installation of the vehicle. Additionally, securing the distal portion 260 to the proximal portion 262 may help control the manner in which the second protection zone 232 deploys. More specifically, attaching the distal portion 260 and the proximal portion 262 together may cause the distal portion 260 to inflate after the proximal portion 262 has substantially inflated. An attachment feature may be applied to the inflatable curtain airbag 210 to carry out such attachment. An "attachment feature" is any device that can secure to objects together. Thus, mechanical fasteners, adhesives, knots, hook and loop fasteners, stitches, and the like are all attachment features that may be used within the scope of the present invention.

In the embodiment of FIGS. 4-8, the attachment feature may take the form of tack stitching 280. The tack stitching 280 may be applied by sewing the proximal portion 262 to the distal portion 260. "Tack stitching" includes any type of stitch that is designed to break at a predictable threshold level of force or stress. Thus, the phrase "tack stitching" is not limited to any particular stitch configuration, but includes any stitching that meets the functional definition stated above. At the desired level of tension, which is caused by inflation of the inflatable curtain airbag 210, the tack stitching 280 may break to release the distal portion 260 from attachment to the proximal portion 262.

As shown, the tack stitching 280 may be applied through the non-inflating region 246 that intersects the first stowed fold line 290 and through the non-inflating region that lies outside the peripheral stitching 244. Thus, the tack stitching 280 need not pierce the first protection zone 230 or the second protection zone 232. This may enable the tack stitching 280 to be applied through the inboard section 238 and the outboard section 239 without concern for interfering with inflation of the first chamber 240 or the second chamber 242. The tack stitching 280 may pass through two layers of the inflatable curtain airbag 210 (i.e., through the inboard section 238 and the outboard section 239 two times each).

In the position shown, the tack stitching 280 may remain in place during substantially complete inflation of the first protection zone 230, and possibly, through partial inflation of the proximal portion 262 of the second protection zone 232. However, the tack stitching 280 may need to break to release the distal portion 260 from the proximal portion 262 prior to significant inflation of the distal portion 260. Thus, the tack stitching 280 may serve to help control the order of inflation of the various parts of the inflatable curtain airbag 210 during deployment.

In alternative embodiments, the distal portion 260 and the proximal portion 262 may be tack stitched at different locations from that illustrated in FIG. 7, or in multiple locations. Additionally or alternatively, different types of attachment features may be used, and may be applied to any suitable location.

After the tack stitching 280 has been applied, the proximal portion 262 may be folded against the forward portion of the first protection zone 230 at the first stowed fold line 290. This may be done by bringing the second stowed fold line 298 inboard and rearward, or out of the page and to the left in the view of FIG. 7, until the second stowed fold line 298 overlies the adjacent portion of the first protection zone 230. Since the forward edge 292 was previously folded to overlie the first stowed fold line 290, the forward edge 292 and the first stowed fold line 290 may both be the forward-most features of the inflatable curtain airbag 210. The resulting configuration is shown in FIG. 8.

Figure 8:
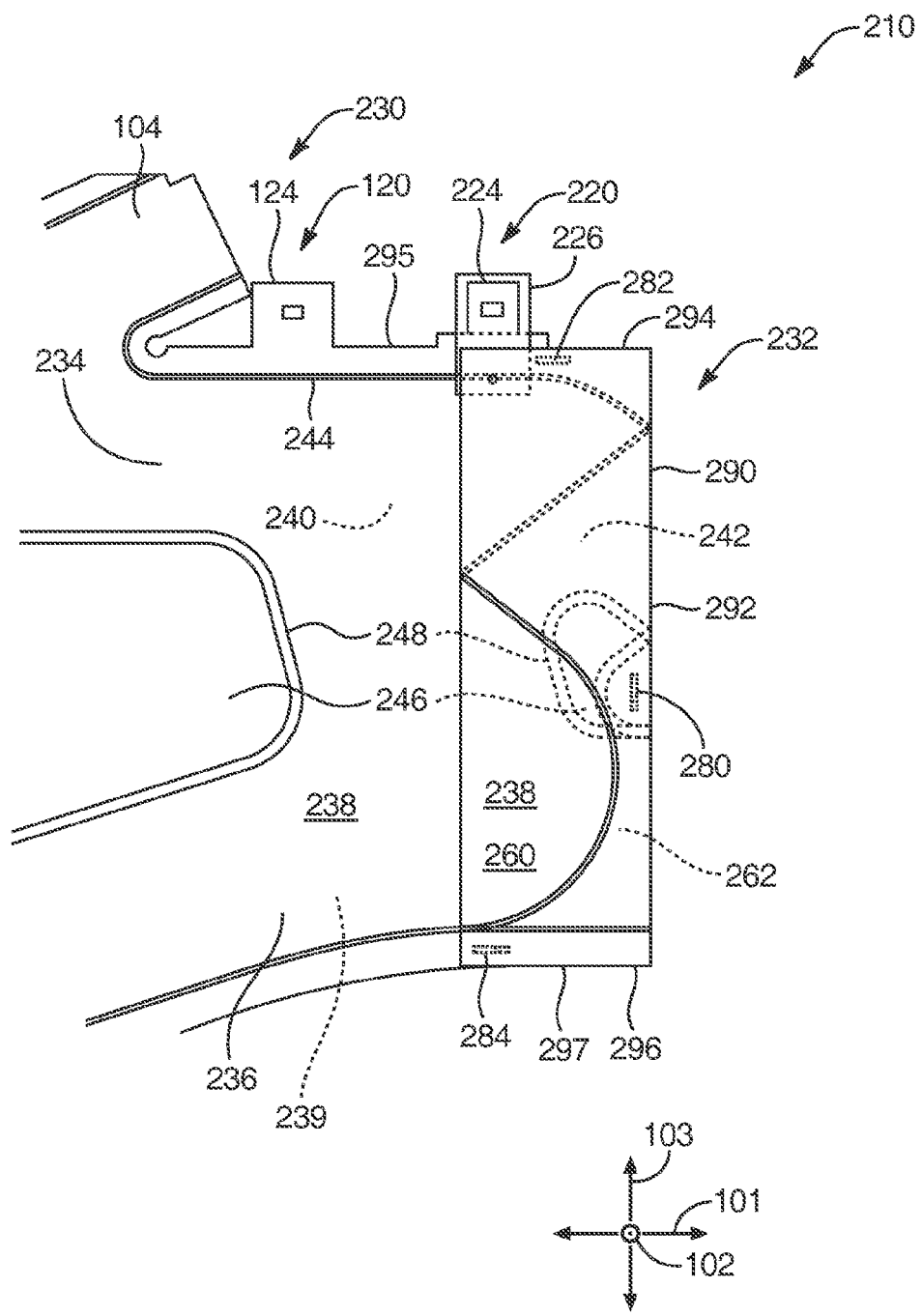
FIG. 8 is a side elevation view of the forward portion of the inflatable curtain airbag assembly of FIG. 4, after secondary folding of the second protection zone.

Referring to FIG. 8, a side elevation view illustrates the forward portion of the inflatable curtain airbag 210 of the airbag assembly 200 of FIG. 4 after the proximal portion 262 has been folded rearward in the manner described in the description of FIG. 7, but prior to the performance of additional folding steps. As shown, the proximal portion 262 has been effectively sandwiched between the distal portion 260 and the first protection zone 230. The first stowed fold line 290 and the forward edge 292 may be substantially aligned along the longitudinal direction 101.

To further control deployment of the inflatable curtain airbag 210, it may be advantageous to apply one or more additional attachment features to the inflatable curtain airbag 210 at this stage. As shown, in FIG. 8, these attachment features may take the form of tack stitching 282 and tack stitching 284. The tack stitching 282 may be positioned proximate the top edge 294 of the second protection zone 232 and the tack stitching 284 may be positioned proximate the bottom edge 296 of the second protection zone 232. The tack stitching 282 and the tack stitching 284 may both be positioned in the non-inflating region of the inflatable curtain airbag 210 that lies outside the peripheral stitching 244. Accordingly, the tack stitching 282 and the tack stitching 284 may share the advantage set forth above of having the tack stitching 280 pass through a non-inflating region 246 of the inflatable curtain airbag 210.

As shown, the tack stitching 282 and the tack stitching 284 may each pass through three layers of the inflatable curtain airbag 210. More precisely, the tack stitching 282 may pass through the non-inflating region proximate the top edge 294 and the top edge 295, within each of the distal portion 260, the proximal portion 262, and the first protection zone 230. Similarly, the tack stitching 284 may pass through the non-inflating region proximate the bottom edge 296 and the bottom edge 297, within each of the distal portion 260, the proximal portion 262, and the first protection zone 230. The tack stitching 282 and the tack stitching 284 may both be positioned rearward of the tack stitching 280. The tack stitching 284 may be positioned proximate the second stowed fold line 298 and the tack stitching 282 may be positioned forward of the tack stitching 284 so that the tack stitching 282 does not interfere with the panel 226, or vice versa.

At the outset of the compaction stage illustrated in FIG. 8, the inflatable curtain airbag 210 may have a Z-shaped configuration as viewed from along the first stowed fold line 290 and the second stowed fold line 298. During deployment, the inflatable curtain airbag 210 may generally expand along the transverse direction 103 prior to unfolding of the second protection zone 232 from the first protection zone 230. Thus, the view of FIG. 8 may be similar to the appearance of the inflatable curtain airbag 210 part way through the deployment process, i.e., when the first protection zone 230 has substantially deployed, but the second protection zone 232 has not yet done so.

After the inflatable curtain airbag 210 has been folded in the longitudinal direction 101, the inflatable curtain airbag 210 may be rolled, folded, or otherwise compacted in the transverse direction 103. Alternatively, the inflatable curtain airbag 210 may be compacted along the transverse direction 103 by folding the inflatable curtain airbag 210 (for example, with a Z-fold), or using other known methods to compact the inflatable curtain airbag 210 along the transverse direction 103.

This compaction may provide the generally elongated shape of the inflatable curtain airbag 210 in the stowed configuration. With the inflatable curtain airbag 210 in the stowed configuration, the mounting assemblies 120 may easily be secured to the roof rail 112 to install the inflatable curtain airbag 210 in the vehicle. As mentioned previously, none of the mounting assemblies 120 need be secured to the A-pillar 114. The forward mounting assembly 220 may be installed just rearward of the rearward end of the A-pillar 114.

The Z-shaped fold of FIG. 8 may advantageously help to control the deployment of the second protection zone 232 by causing the second protection zone 232 to move forward generally prior to moving inboard. In the vehicle, the second protection zone 232 may be positioned near a location directly outboard of the occupant zone 160. It may not be desirable for the second protection zone 232 to contact the occupant during deployment. Thus, it may be advantageous to have the second protection zone 232 unfold generally forward before excessive inboard motion occurs.

The Z-shaped fold may encourage such early forward motion because it may cause the inflatable curtain airbag 210 to unfold first at the first stowed fold line 290 as inflation gas passes through the first stowed fold line 290 and into the second chamber 242. As the second protection zone 232 begins to unfold from the first protection zone 230 at the first stowed fold line 290, the second stowed fold line 298 may swing inboard. The second stowed fold line 298 may begin to unfold when the proximal portion 262 of the second protection zone 232 is already oriented generally forward (i.e., the second stowed fold line 298 is forward of the first stowed fold line 290). This may help avoid contact of the occupant with the second protection zone 232 during deployment.

The use of the tack stitching 280, the tack stitching 282, and the tack stitching 284 may also help encourage forward expansion of the second protection zone 232. More precisely, the inflatable curtain airbag 210 may inflate initially via influx of inflation gas into the first chamber 240 through the tube 106. As the forward portion of the first protection zone 230 inflates, the expansion of the forward portion of the first protection zone 230 may exert tensile stress on the tack stitching 282 and the tack stitching 284, which may cause the tack stitching 282 an the tack stitching 284 to break, thereby permitting the proximal portion 262 (and the distal portion 260, which may still be secured to the proximal portion 262 by virtue of the tack stitching 280), to pivot forward about the first stowed fold line 290. The distal portion 260 and the proximal portion 262 may pivot first inboard and then outboard again until they are generally parallel to the first protection zone 230, as shown in FIG. 7.

As the proximal portion 262 and the distal portion 260 pivot forward, the proximal portion 262 may begin to inflate. The resulting stresses on the tack stitching 280 may cause the tack stitching 280 to break, thereby releasing the distal portion 260 from the proximal portion 262. This may occur before or after the distal portion 260 and the proximal portion 262 have fully unfolded, i.e., reached an orientation parallel to the first protection zone 230. Breakage of the tack stitching 280 may leave the distal portion 260 free to pivot forward relative to the proximal portion 262 about the second stowed fold line 298. Since the distal portion 260 may be outboard of the proximal portion 262, as in FIG. 7, forward pivotal motion of the distal portion 260 may entail a swing outboard until the forward edge 292 is directly outboard of the second stowed fold line 298. The distal portion 260 may continue to pivot forward, now swinging inboard until the distal portion 260 is also generally parallel to the first protection zone 230 and the proximal portion 262.

As described above, the tack stitching 280, tack stitching 282, and tack stitching 284 may help to make the various stages of deployment of the inflatable curtain airbag 210 more discrete, and therefore more predictable. Consequently, the second protection zone 232 may deploy reliably in the proper location, and in a manner that generally avoids premature contact with the occupant.

As set forth above, the present invention may be used to enhance the protection provided by the forward portion of an inflatable curtain airbag. The principles of the present invention are equally applicable to the rearward portion of such an airbag. One exemplary embodiment in which the teaching of the invention are applied to the rearward portion of an airbag will be shown and described in connection with FIG. 9.

Figure 9:
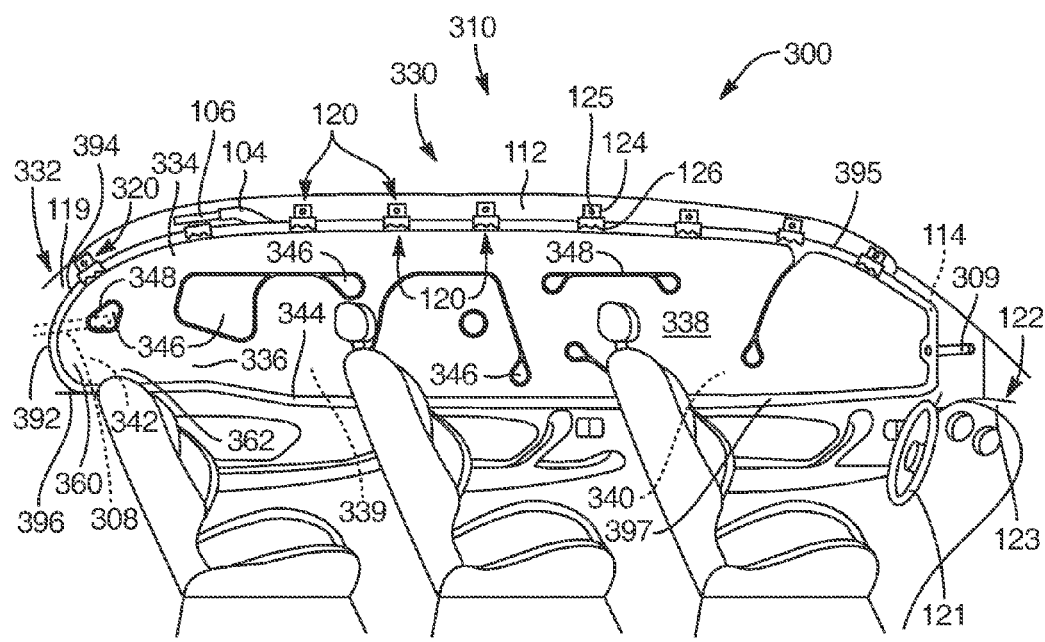
FIG. 9 is a side elevation view of an airbag assembly according to another alternative embodiment of the invention, with the airbag curtain in the deployed configuration.
Figure 9:
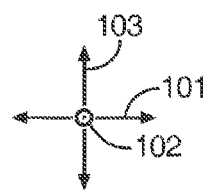

Referring to FIG. 9, a side elevation view illustrates an airbag assembly 300 according to another alternative embodiment of the invention. The airbag assembly 300 may have an inflatable curtain airbag 310 that is designed to provide enhanced lateral impact and/or rollover protection like the inflatable curtain airbag 210 of the previous embodiment. However, the inflatable curtain airbag 310 may be designed specifically to provide enhanced lateral protection toward the rear end of the vehicle (the left side in the view of FIG. 9). The inflatable curtain airbag 310 may be designed to accomplish this with minimal premature contact with the associated vehicle occupants (for example, occupants of the rear-most seat shown in FIG. 9). Thus, the inflatable curtain airbag 310 may be nearly the same as the inflatable curtain airbag 210 of the previous embodiment, but with the opposite orientation (i.e., with the end of the inflatable curtain airbag 210 that is positioned toward the front of the vehicle in FIG. 5 at the rear end of the vehicle, and vice versa).

The inflatable curtain airbag 310 may have a first protection zone 330 and a second protection zone 332. The inflatable curtain airbag 310 may include an inboard section 338 and an outboard section 339, which may be attached together to define a first chamber within the first protection zone 230 and a second chamber 242 within the second protection zone 232. The inboard section 338 and the outboard section 339 may be secured together via peripheral stitching 344 and interior stitching 348 that defines non-inflating regions 346 of the inflatable curtain airbag 310.

The second protection zone 332 may have a distal portion 360 positioned to overlie the D-pillar 119 and a proximal portion 362 positioned between the distal portion 360 and the first protection zone 330. The second protection zone 332 may have a rearward edge 392, a top edge 394, and a bottom edge 396. The first protection zone 330 may also have a top edge 395 and a bottom edge 397.

As in the previous embodiment, the inflatable curtain airbag 310 may be folded at first and second stowed fold lines (not shown) such that the proximal portion 362 is between the distal portion 360 and the first protection zone 330, defining a Z-shape when viewed from along the transverse direction 103. Deployment of the inflatable curtain airbag 310 may be similar to that of the inflatable curtain airbag 210, except that the second protection zone 332 of the inflatable curtain airbag 310 may unfold generally rearward to cover the D-pillar 119 and/or the adjoining window. Attachment features such as the tack stitching 280, the tack stitching 282, and the tack stitching 284 of the inflatable curtain airbag 210 may be applied to the inflatable curtain airbag 310 to help control deployment of the second protection zone 332 as shown in FIGS. 6, 7, and 8 and as set forth in the accompanying description.

FIG. 9 presents only one possible method of applying the invention to enhance the protection afforded by the rearward portion of an inflatable curtain airbag. With the aid of the present disclosure, a person of skill in the art would recognize that the invention may also be applied to a wide variety of alternative embodiments to provide enhanced protection for the forward portion or the rearward portion of an inflatable curtain airbag.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention. Embodiments of the invention in which an exclusive property or privilege is claimed are defined as follows.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag assembly for disposition proximate a roof of a vehicle to shield a vehicle occupant from impacting at least one lateral surface of the vehicle, the airbag assembly comprising:
   an inflatable curtain airbag having a stowed configuration for disposition proximate the roof of the vehicle and a deployed configuration into which the inflatable curtain airbag deploys downward between the vehicle occupant and the at least one lateral surface of the vehicle, the inflatable curtain airbag comprising:
      a first protection zone comprising a first interior chamber and a first non-inflating region;
      a second protection zone comprising a second interior chamber in fluid communication with the first interior chamber and a second non-inflating region; and
      a first attachment feature;
   wherein, in the stowed configuration, the inflatable curtain airbag is folded longitudinally at a first stowed fold line such that the second protection zone overlies a portion of the first protection zone;
- wherein, in the stowed configuration, the first attachment feature secures the second non-inflating region of the second protection zone to the first non-inflating region of the first protection zone to keep the second protection zone folded rearward until deployment such that, during deployment, the first attachment feature releases the second protection zone to allow the second protection zone to unfold one of forward and rearward of the first protection zone.

2. The airbag assembly of claim 1, wherein the first attachment feature comprises tack stitching that breaks in response to application of a threshold level of stress on the tack stitching to release the second protection zone from the first protection zone.

3. The airbag assembly of claim 1, wherein the second protection zone comprises a distal portion and a proximal portion positioned between the distal portion and the first protection zone in the deployed configuration;
- wherein, in the stowed configuration, the second protection zone is further folded at a second stowed fold line such that the distal portion overlies the proximal portion.

4. The airbag assembly of claim 1, wherein the second protection zone is positioned to inflate inboard of a lateral surface toward a rear end of the vehicle; wherein, in the stowed configuration, the inflatable curtain airbag is folded forward at the first stowed fold line.

5. The airbag assembly of claim 4, further comprising:
- an inflator that produces gas in response to detection of impact to trigger deployment of the inflatable curtain airbag; and
- at least one tether comprising a first end secured to the inflatable curtain airbag and a second end securable to the vehicle to help keep the inflatable curtain airbag in place after deployment.

6. An airbag assembly for disposition proximate a roof of a vehicle to shield a vehicle occupant from impacting at least one lateral surface of the vehicle, the airbag assembly comprising:
- an inflatable curtain airbag having a stowed configuration for disposition proximate the roof of the vehicle and a deployed configuration into which the inflatable curtain airbag deploys downward between the vehicle occupant and the at least one lateral surface of the vehicle, the inflatable curtain airbag comprising:
  - a first protection zone comprising a first interior chamber;
  - a second protection zone comprising a second interior chamber in fluid communication with the first interior chamber, a distal portion, and a proximal portion positioned between the distal portion and the first protection zone in the deployed configuration;
  - a first attachment feature;
- wherein, in the stowed configuration, the inflatable curtain airbag is folded longitudinally at a first stowed fold line such that the second protection zone overlies a portion of the first protection zone and the second protection zone is further folded at a second stowed fold line such that the distal portion overlies the proximal portion;
- wherein, in the stowed configuration, the first attachment feature secures the second protection zone to the portion of the first protection zone to keep the second protection zone folded rearward until deployment such that, during deployment, the first attachment feature releases the second protection zone to allow the second protection zone to unfold one of forward and rearward of the first protection zone; and
- a second attachment feature;
- wherein, in the stowed configuration, the second attachment feature secures the distal portion to the proximal portion to keep the distal portion and the proximal portion folded together until deployment;
- wherein, during deployment, the second attachment feature releases the distal portion from the proximal portion to allow the distal portion to unfold one of forward and rearward of the proximal portion.

7. The airbag assembly of claim 6, wherein the inflatable curtain airbag further comprises a third attachment feature;
- wherein, in the stowed configuration, the third attachment feature cooperates with the first attachment feature to secure the second protection zone to the portion of the first protection zone;
- wherein the first attachment feature is positioned proximate a top edge of the second protection zone, the third attachment feature is positioned proximate a bottom edge of the second protection zone, and the second attachment feature is positioned proximate a location equidistant from the top edge and the bottom edge.

8. The airbag assembly of claim 6, wherein the second stowed fold line is substantially parallel to the first stowed fold line, wherein the inflatable curtain airbag is folded such that the proximal portion lies generally between the distal portion and the first protection zone.

9. The airbag assembly of claim 8, wherein the first and second attachment features are positioned and configured such that during deployment, the proximal portion substantially inflates prior to release of the second attachment feature to allow the distal portion to unfold one of forward and rearward of the proximal portion.

10. A method for stowing an airbag assembly proximate a roof of a vehicle having a lateral surface, to protect an occupant in the vehicle, the method comprising:
- providing an inflatable curtain airbag comprising a first protection zone comprising a first interior chamber and a first non-inflating region, and a second protection zone comprising a second interior chamber in fluid communication with the first interior chamber and a second non-inflating region;
- folding the inflatable curtain airbag at a first stowed fold line such that the second protection zone overlies at least a portion of the first protection zone;
- securing the second protection zone to the portion of the first protection zone with a first attachment feature to keep the second protection zone folded longitudinally until deployment;
- compacting the inflatable curtain airbag into a generally elongated shape; and
- securing the inflatable curtain airbag proximate the roof of the vehicle such that, in response to introduction of inflation gas into the inflatable curtain airbag, the first protection zone expands downward to be positioned between the occupant and the lateral surface of the vehicle;
- wherein securing the second non-inflating region of the second protection zone to the first non-inflating region of the first protection zone comprises applying the first attachment feature such that, during deployment, the first attachment feature releases the second protection zone to allow the second protection zone to unfold one of forward and rearward of the first protection zone.

11. The method of claim 10, wherein the first attachment feature comprises tack stitching;

wherein securing the second protection zone to the portion of the first protection zone comprises sewing the second protection zone to the portion of the first protection zone with the tack stitching such that the tack stitching breaks in response to application of a threshold level of stress on the tack stitching to release the second protection zone from the first protection zone.

12. The method of claim 10, wherein the second protection zone comprises a distal portion and a proximal portion positioned between the distal portion and the first protection zone after deployment, the method further comprising:
folding the inflatable curtain airbag at a second stowed fold line such that the distal portion overlies the proximal portion; and
securing the distal portion to the proximal portion with a second attachment feature to keep the distal portion and the proximal portion folded together until deployment;
wherein securing the distal portion to the proximal portion comprises applying the second attachment feature such that, during deployment, the second attachment feature releases the distal portion from the proximal portion to allow the distal portion to unfold one of forward and rearward of the proximal portion.

13. The method of claim 12, wherein securing the second protection zone to the portion of the first protection zone further comprises applying a third attachment feature such that, during deployment, the third attachment feature releases the second protection zone to allow the second protection zone to unfold one of forward and rearward of the first protection zone;
wherein applying the first attachment feature comprises securing the first attachment feature proximate a top edge of the second protection zone;
wherein applying the third attachment feature comprises securing the third attachment feature proximate a bottom edge of the second protection zone;
wherein applying the second attachment feature comprises securing the second attachment feature proximate a location equidistant from the top edge and the bottom edge.

14. The method of claim 12, wherein applying the first and second attachment features comprises securing the first and second attachment features such that during deployment, the proximal portion substantially inflates prior to release of the second attachment feature to allow the distal portion to unfold one of forward and rearward of the proximal portion.

15. The method of claim 10, further comprising:
providing an inflator that produces gas in response to detection of impact to trigger deployment of the inflatable curtain airbag;
connecting the inflator to the inflatable curtain airbag;
providing a plurality of mounting assemblies distributed along a length of the inflatable curtain airbag; and
securing the mounting assemblies to the vehicle to attach the inflatable curtain airbag to the vehicle such that the second protection zone is positioned to inflate inboard of a lateral surface toward a rear end of the vehicle;

wherein, folding the inflatable curtain airbag at the first stowed fold line comprises folding the inflatable curtain airbag forward at the first stowed fold line.

16. An airbag assembly, comprising:
an inflatable curtain airbag stowed proximate a roof of a vehicle, the inflatable curtain airbag comprising a first protection zone, a first attachment feature, and a second protection zone folded against the first protection zone such that the second protection zone overlies at least a portion of the first protection zone;
an inflator in fluid communication with a first chamber within the first protection zone and a second chamber within the second protection zone;
a plurality of mounting assemblies that secure the first protection zone to the vehicle; and
at least one tether comprising a first end secured to the inflatable curtain airbag and a second end securable to the vehicle to help keep the inflatable curtain airbag in place after deployment;
wherein, prior to deployment, the first attachment feature secures the second protection zone to the portion of the first protection zone to keep the second protection zone folded longitudinally until deployment such that, in response to production of gas by the inflator, the first protection zone deploys downward between a vehicle occupant and at least one lateral surface of the vehicle, and the first attachment feature releases the second protection zone to allow the second protection zone to unfold one of forward and rearward of the first protection zone; and
wherein the first attachment feature comprises first tack stitching that breaks in response to application of a threshold level of stress on the first tack stitching to release the second protection zone from the first protection zone;
wherein the first protection zone comprises a first non-inflating region and the second protection zone comprises a second non-inflating region, wherein the first tack stitching secures the first non-inflating region to the second non-inflating region.

17. The airbag assembly of claim 16, wherein the second protection zone comprises a distal portion and a proximal portion positioned between the distal portion and the first protection zone after deployment;
wherein, prior to deployment, the second protection zone is further folded such that the distal portion overlies the proximal portion and the proximal portion lies generally between the distal portion and the first protection zone;
wherein the inflatable curtain airbag further comprises a second attachment feature;
wherein, prior to deployment, the second attachment feature secures the distal portion to the proximal portion to keep the distal portion and the proximal portion folded together until deployment;
wherein, during deployment, the second attachment feature releases the distal portion from the proximal portion to allow the distal portion to unfold one of forward and rearward of the proximal portion.

* * * * *